May 5, 1931.   G. ROTTMAN   1,804,032
SAFETY APPARATUS FOR MOTOR VEHICLES
Filed Nov. 14, 1929   13 Sheets-Sheet 2
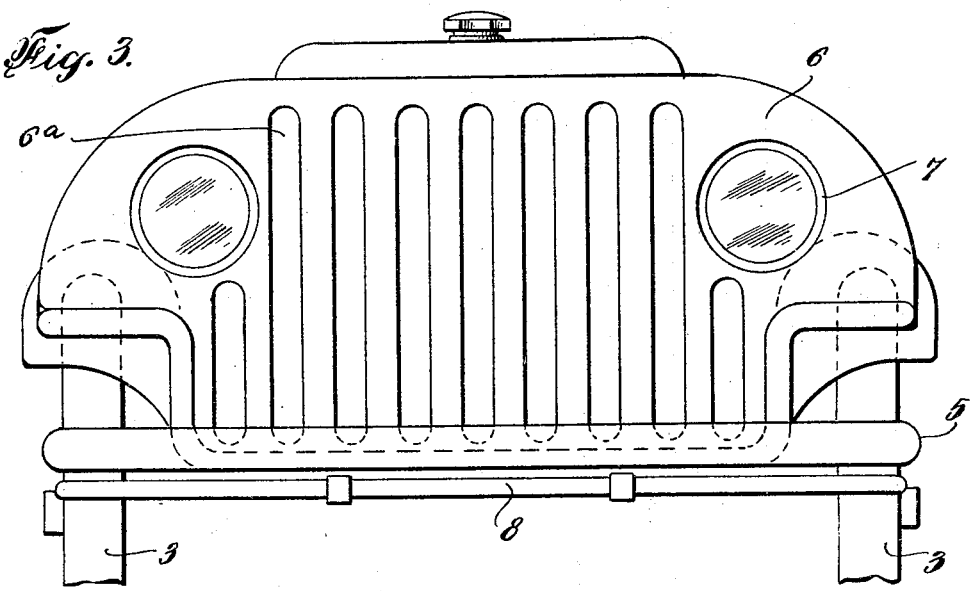
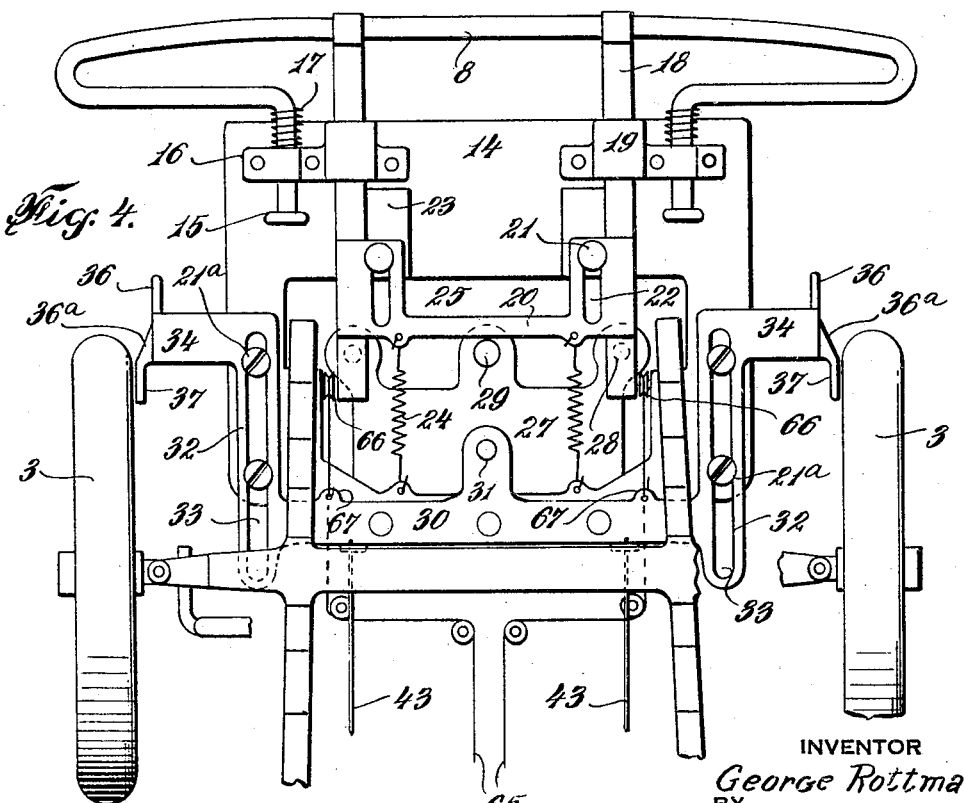
INVENTOR
George Rottman.
BY
William F. Nickel
ATTORNEY May 5, 1931.  G. ROTTMAN  1,804,032
SAFETY APPARATUS FOR MOTOR VEHICLES
Filed Nov. 14, 1929  13 Sheets-Sheet 3
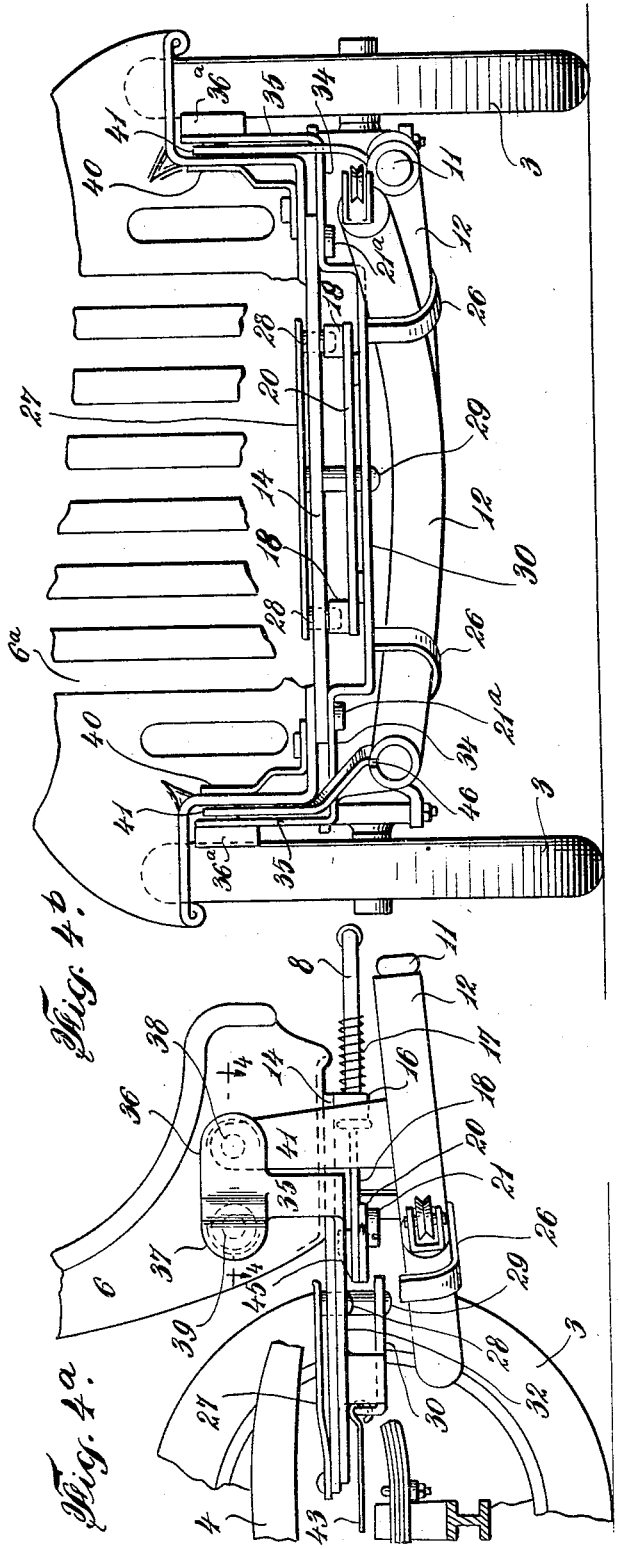
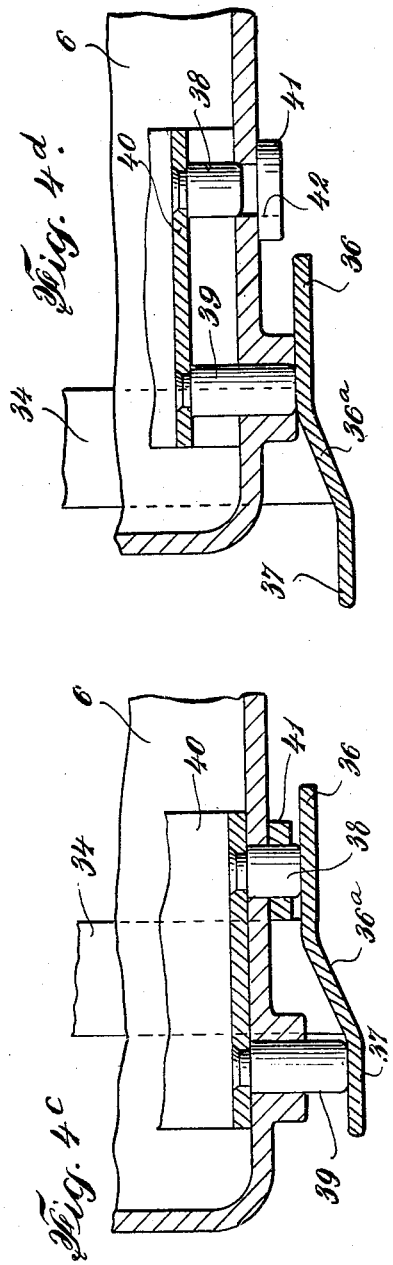
INVENTOR
George Rottman.
BY
William F. Nickel
ATTORNEY May 5, 1931. G. ROTTMAN 1,804,032
SAFETY APPARATUS FOR MOTOR VEHICLES
Filed Nov. 14, 1929 13 Sheets-Sheet 4
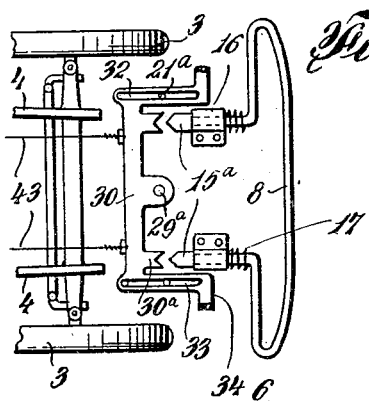
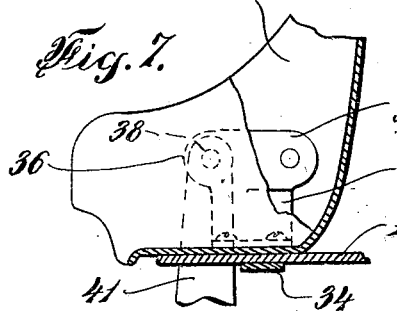
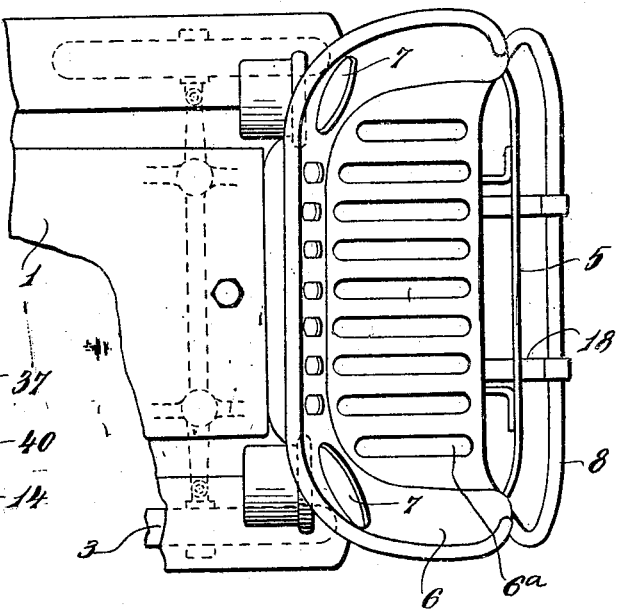
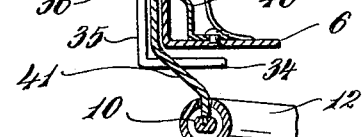
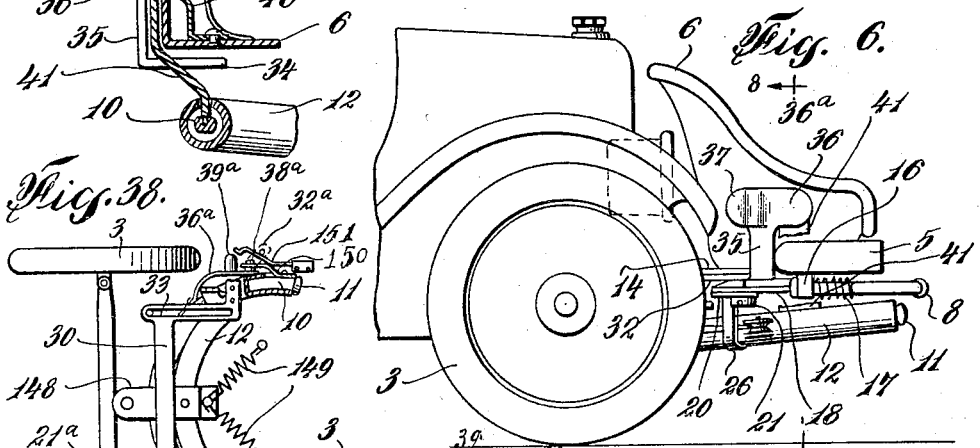
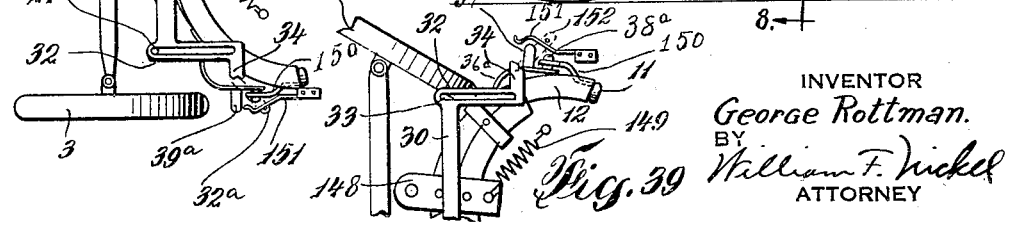
INVENTOR
George Rottman.
BY
William F. Nickel
ATTORNEY May 5, 1931. G. ROTTMAN 1,804,032
SAFETY APPARATUS FOR MOTOR VEHICLES
Filed Nov. 14, 1929 13 Sheets-Sheet 5
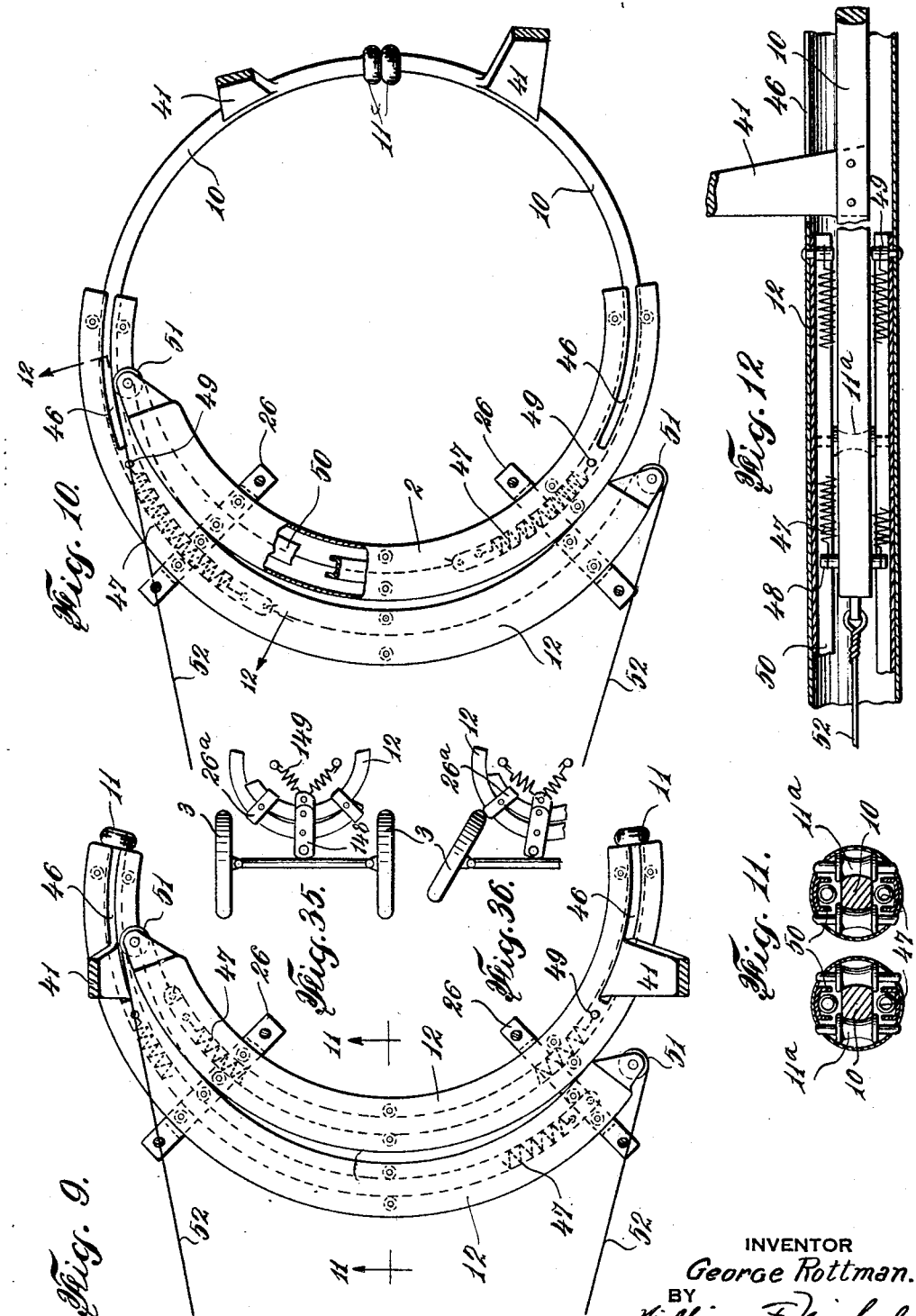
INVENTOR
*George Rottman.*
BY
*William F. Nickel*
ATTORNEY

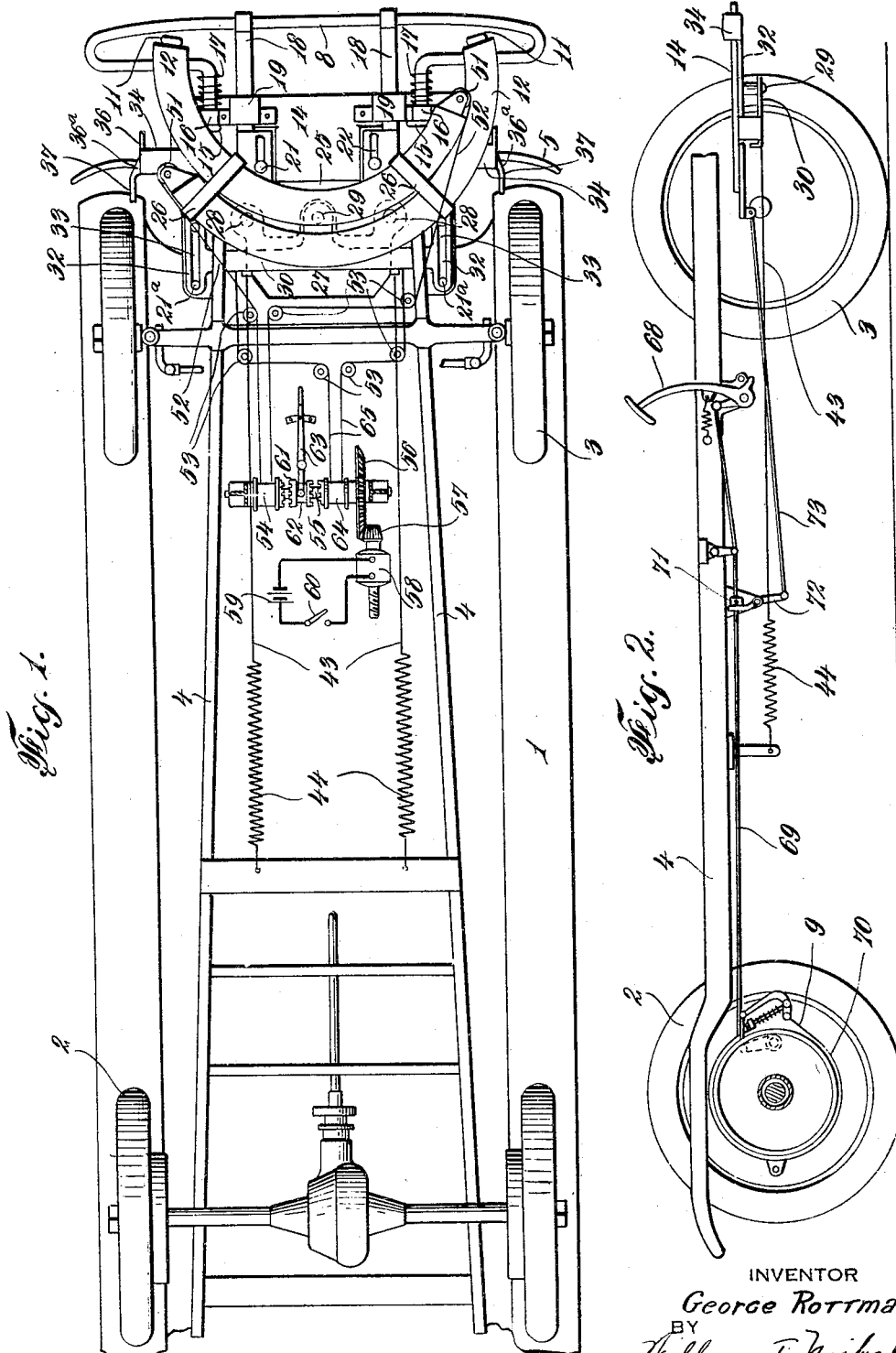

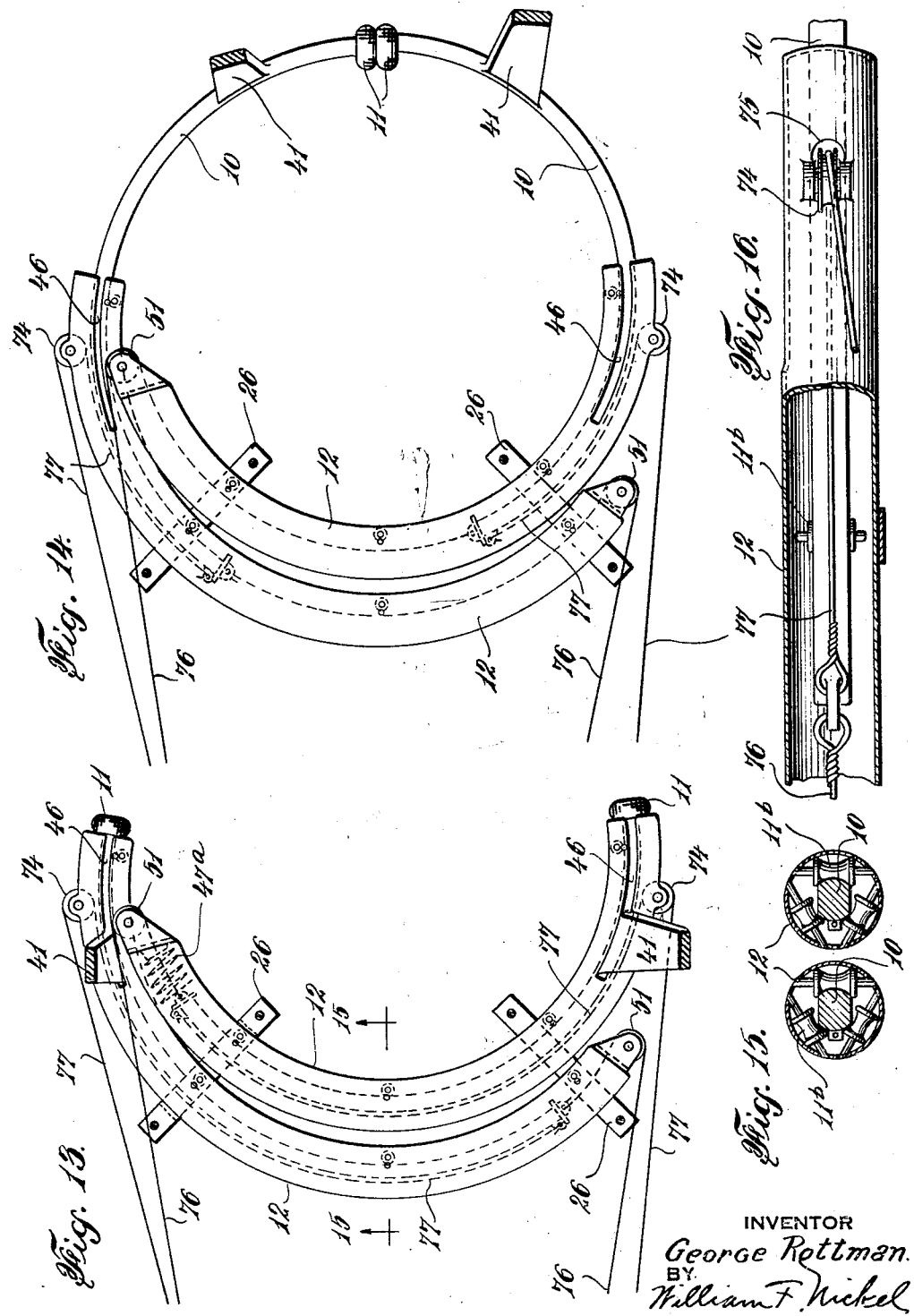

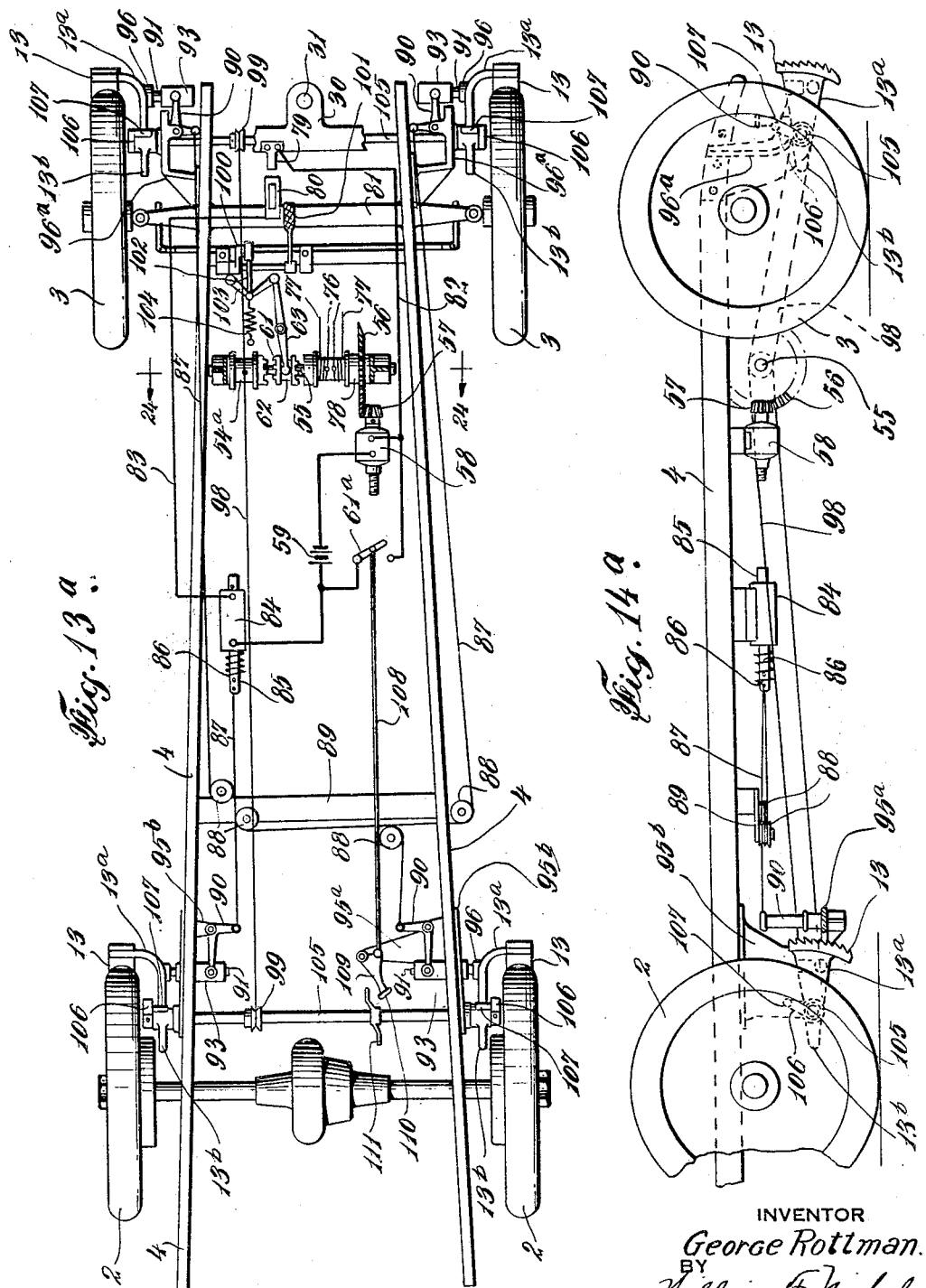

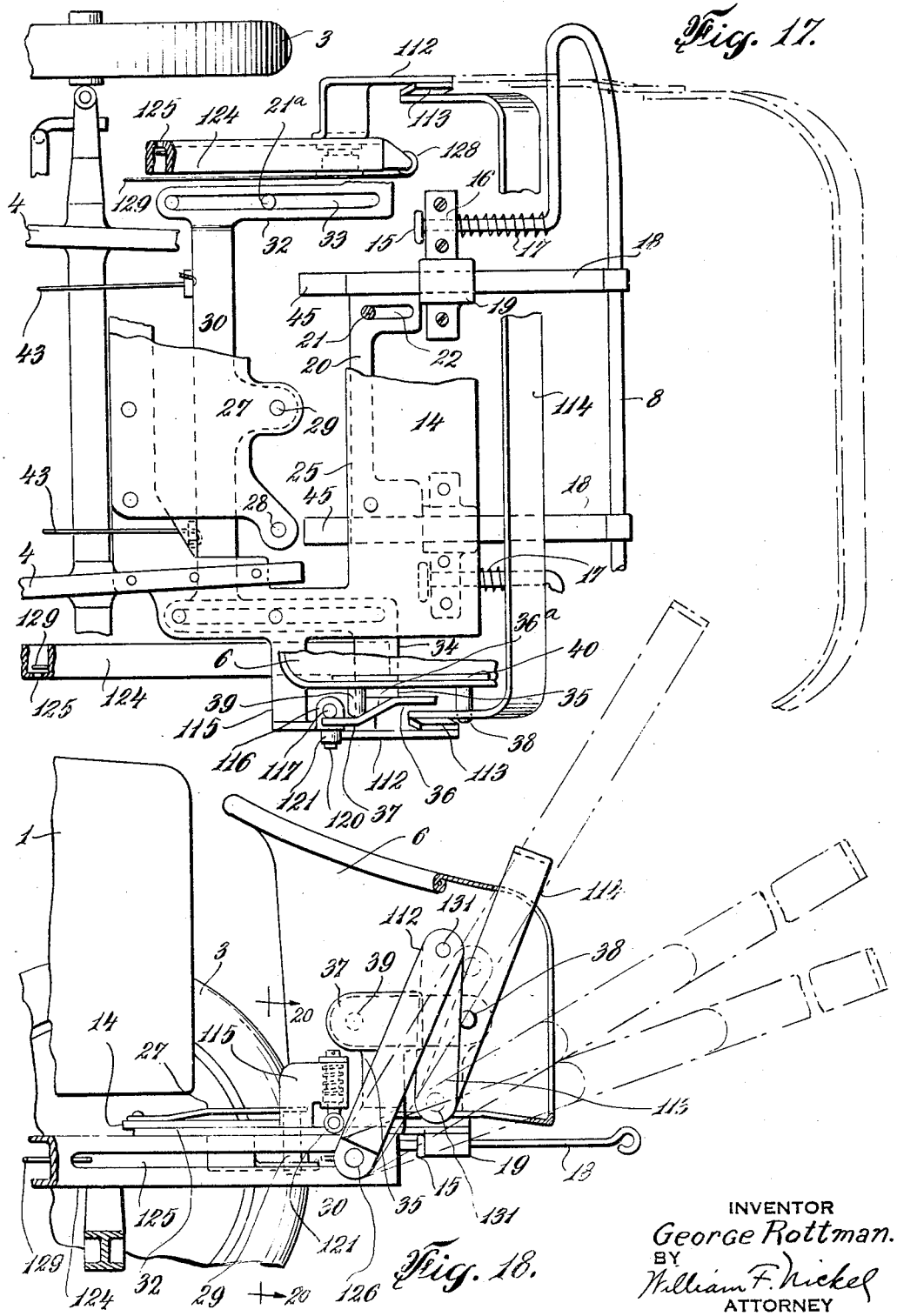

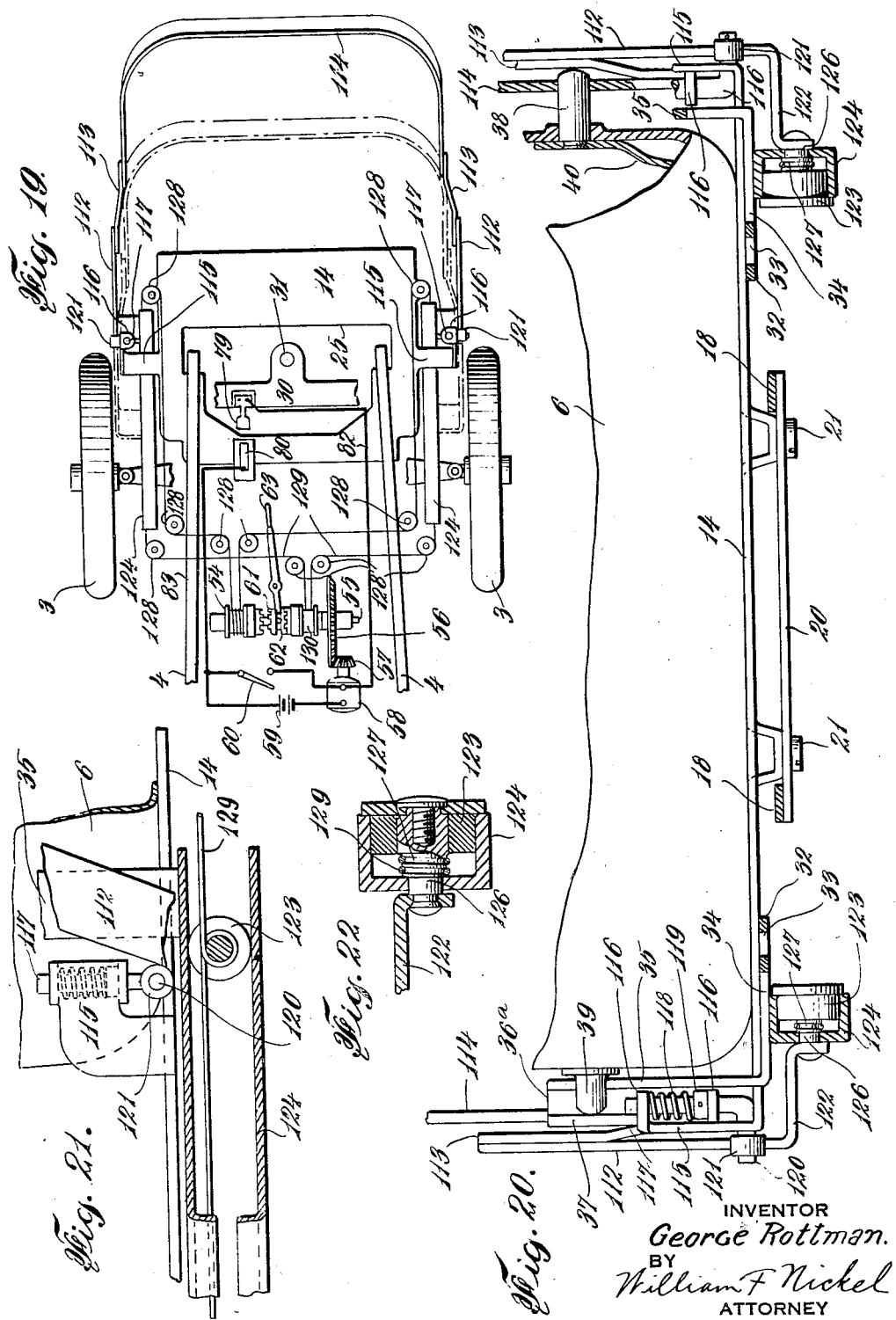

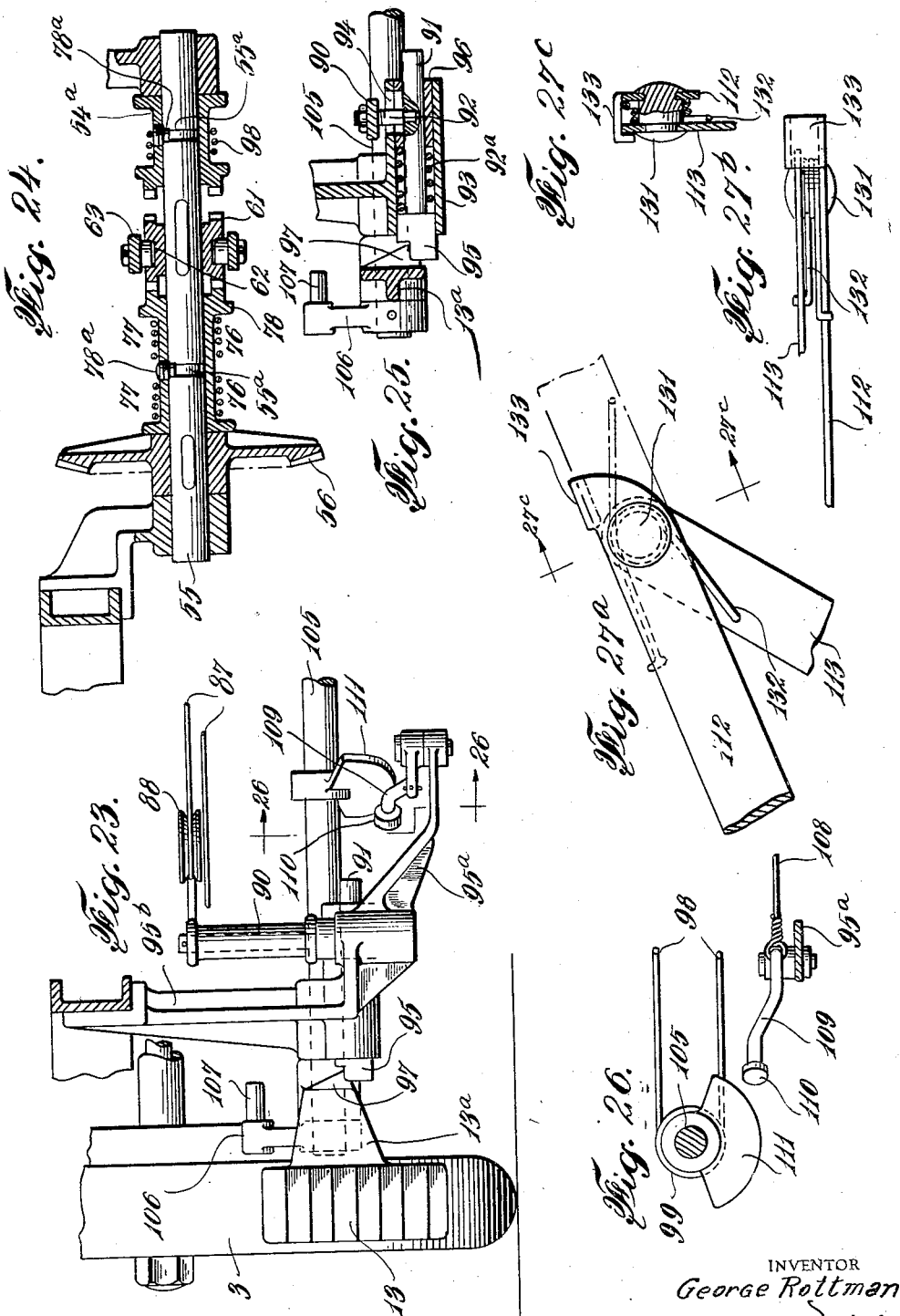

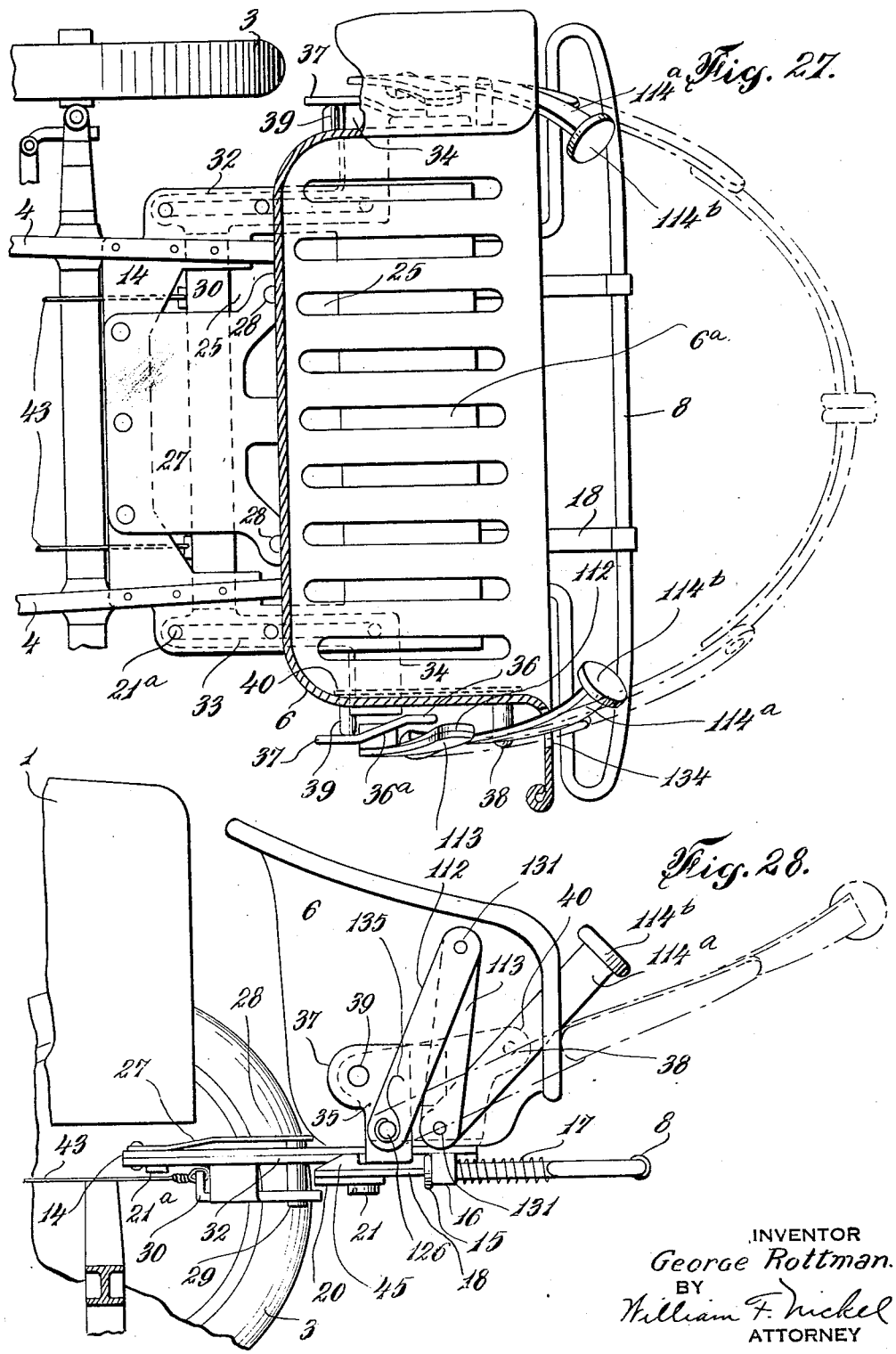

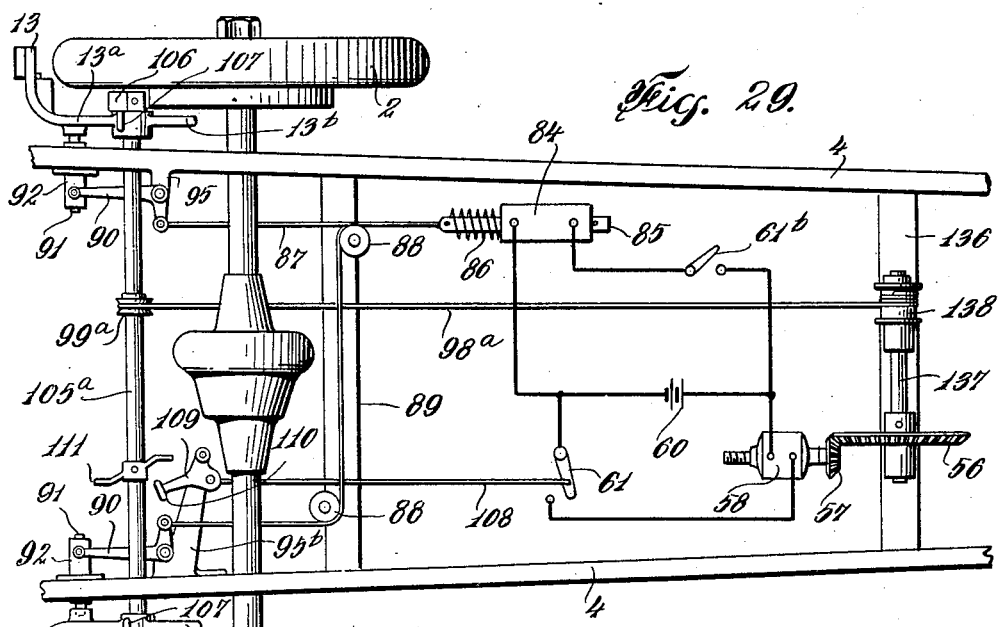
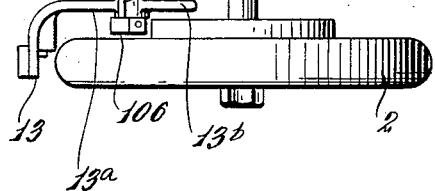
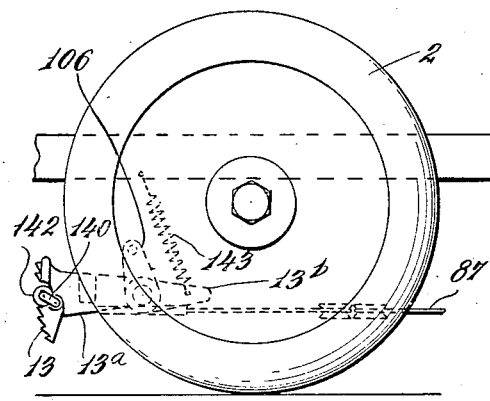
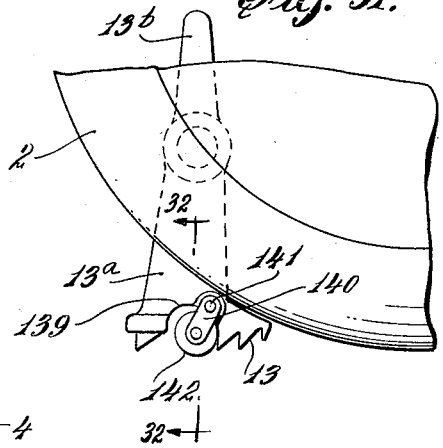
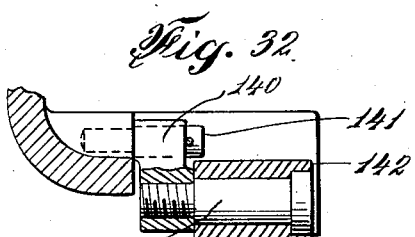

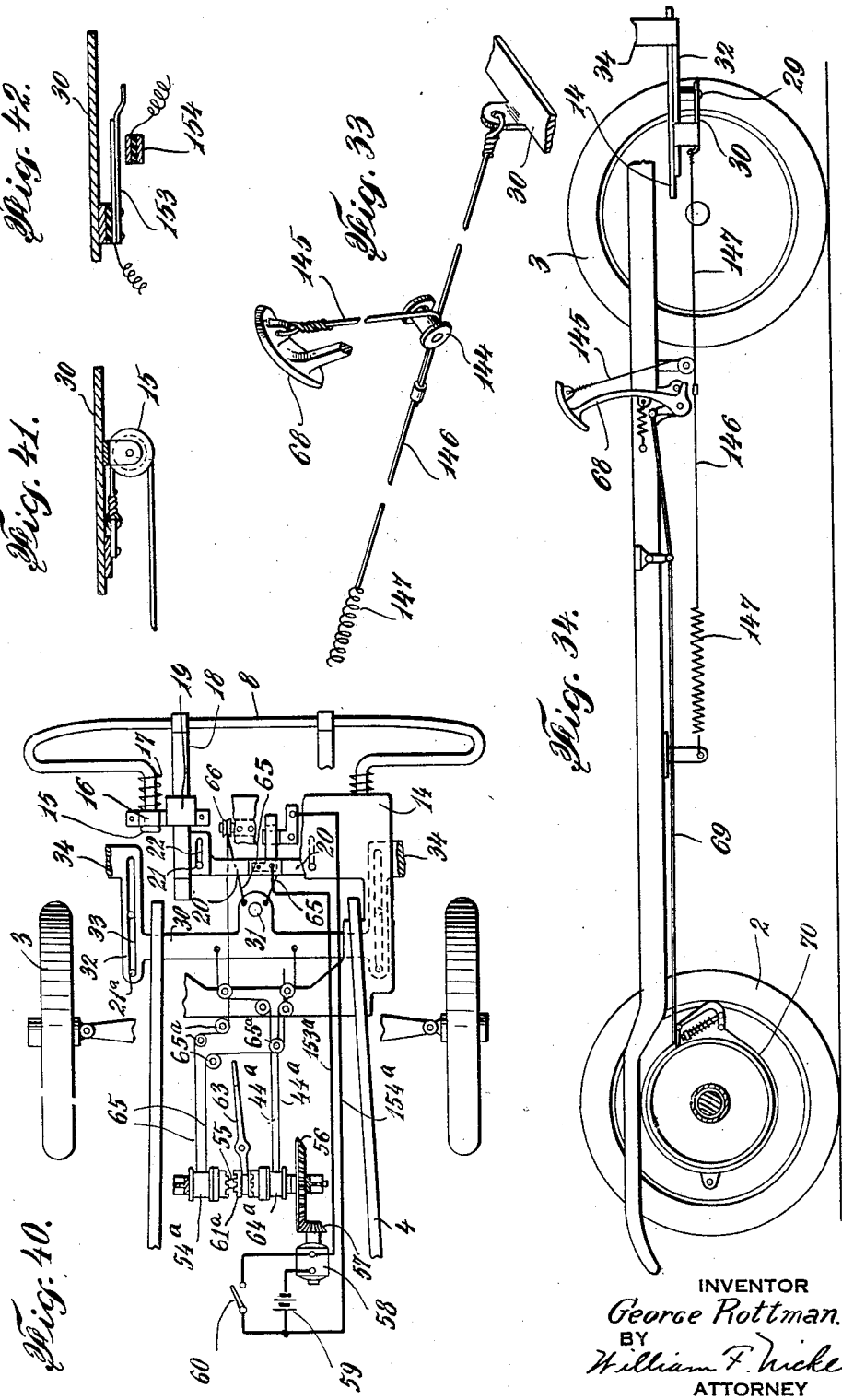

Patented May 5, 1931

1,804,032

UNITED STATES PATENT OFFICE

GEORGE ROTTMAN, OF BROOKLYN, NEW YORK

SAFETY APPARATUS FOR MOTOR VEHICLES

Application filed November 14, 1929. Serial No. 407,167.

This invention relates to improvements in safety devices for automobiles and other motor vehicles, and is designed to prevent bodily injury in case a pedestrian is struck by the vehicle when it is in motion.

Generally speaking, the object of the invention is to provide safety apparatus which is certain in operation, and which is adapted to seize and support the pedestrian at the instant when he is hit, so as to prevent him from falling under the wheels of the vehicle. At the same instant the brakes are applied and other members are brought into play to bring to a standstill the wheels of the vehicle and thus stop it immediately upon the spot where the mishap occurs.

The following description sets forth several embodiments of the invention, but changes may of course be made without exceeding its scope or departing from the principle thereof.

On the accompanying drawings—

Figure 1 is a bottom view showing an automobile equipped according to my invention.

Figure 2 is a side view thereof.

Figure 3 is a front view of part of the apparatus.

Figure 4 is a bottom view of the front of an automobile equipped according to my invention, the apparatus being shown in part.

Figures 4a and 4b are respectively a side view and a front view of the same construction mounted upon the front end of a motor vehicle.

Figures 4c and 4d are sectional views on the line 4—4, Figure 4a, showing the mode of operation of certain parts.

Figure 5 is a top view of the front of an automobile equipped according to my invention.

Figure 6 is a side view of what is shown in Figure 5.

Figures 7 and 8 are sectional details.

Figures 9 and 10 are top views showing the members for seizing and supporting a pedestrian to prevent the latter being thrown when struck by the automobile.

Figures 11 and 12 are sectional views on the lines 11—11 and 12—12 of Figures 9 and 10 respectively.

Figures 13 and 14 are views similar to views 9 and 10 respectively, showing a modification.

Figures 13a and 14a are top and side views of a motor vehicle with another form of my invention.

Figures 15 and 16 are sectional views, the former being on the line 15—15 of Figure 13 and the latter being a section taken longitudinally through one of the sleeves on Figure 13.

Figures 17 and 18 are respectively a top view and a side view of a further form of my invention.

Figure 19 is another top view of the front of the device shown in Figure 17 with some of the electrical connections added.

Figure 20 is a sectional view taken on line 20—20 in Figure 18.

Figures 21 and 22 present details of the parts appearing on Figures 17 and 18.

Figure 23 shows a front view of one of the wheels of the automobile with a member separate from the brakes for stopping the wheel.

Figure 24 is a sectional view showing the mechanism including a clutch for controlling this member and other parts.

Figure 25 is a sectional detail of a catch for keeping the stopping member normally out of operative position.

Figure 26 is a sectional line on 26—26 of Figure 23.

Figures 27a, 27b and 27c are respectively a side view, a top view and a section on line 27c—27c of Figure 27a showing details in connection with the form of the invention appearing in Figures 17 to 20, inclusive.

Figures 27 and 28 are respectively a top view and a side view of another form of my invention.

Figure 29 is a top plan of a further modification showing stopping members for the wheels of the car.

Figure 30 is a side view of one of the wheels of the car with a stopping member associated therewith.

Figure 31 is a detail view showing how the said stopping member operates.

Figure 32 is a section on the line 32—32 of Figure 31.

Figures 33 and 34 are perspective views of a different type of connection by which the brakes are set in the practice of my invention.

Figures 35 and 36 are diagrammatic views of still other forms of my invention.

Figure 37 shows diagrammatically a modification of certain parts shown in Figure 4.

Figures 38 and 39 show diagrammatically an additional apparatus according to my invention.

Figure 40 is a top view of some apparatus in connection with a still further method of practicing my invention; and Figures 41 and 42 present a detail of what appears in Figure 40.

The same numerals identify the same parts throughout.

In Figures 1 to 11, inclusive, 1 indicates an automobile seen from underneath, 2 the rear wheels, 3 the front wheels and 4 the side-beams. At 5 is the usual front bumper bar, shown in part at the right of Fig. 1, and 6 is a chair or seat affixed to the front of beams 4 before the radiator, the back of the chair having openings 7 through which the light from the head lamps may pass and slots 6a for the passage of cooling air. Below the bumper 5 and chair 6 is an additional bumper 8, made resilient out of rubber or steel covered with rubber and disposed beyond bumper 5. In case of collision with a pedestrian the bar 8 is pushed rearward and operates mechanism to apply the brakes 9 and simultaneously to actuate arms or supports 10 (Fig. 10) having on their ends knobs 11, which come together and make the pedestrian fall upon the chair 6, encircling his body to prevent him from being knocked to the ground. The arms of supports 10 are normally retracted within sleeves 12 beneath seat 6. At the same time members 13 carried adjacent each wheel (Figures 13a and 14a) are dropped and the car is quickly brought to a standstill. Beneath seat 6 is a stationary plate 14, which may also be affixed to the beams 4 and bumper 5. The ends of the bumper 8 are bent rearward of the car, extending under base plate 14, terminating in knobs 15 (Fig. 4) and slidably mounted in bearings 16 on the lower face of plate 14. Springs 17 normally act to push bumper 8 out in front. Secured to the bumper 8 are rods 18, passing through guides 19 on the lower face of plate 14, and the rods 18 are connected at their rear ends by a cross-piece 20. This cross-piece receives studs 21 affixed in the plate 14 and has slots 22 for the studs 21. Bumper 8 may be a spring covered with any resilient material.

The studs 21 and slots 22 limit the outward movement of bumper 8 by springs 17, Figure 1, and rearward movement of bumper 8 when it strikes a pedestrian, the end of the rearward movement being shown in Figure 4. Blocks or spacers 23 may be attached to the bottom of plate 14 (Fig. 4) to receive studs or rivets 21. Springs 24 may be attached to the piece 20 and to fixed points on plate 14 tending to pull in the bumper 8 against the springs 17. Plate 14 may have an opening 25 to the rear edge of which springs 24 (Fig. 4a) are attached and 26 are brackets secured to plate 14 for carrying the sleeves 12. At 27 is indicated a resilient plate (Fig. 4a) secured at its rear edge to the rear edge of base plate 14. In front, at each side, plate 27 (Figs. 1, 4, and 4a) has projections 28 and a central projection carrying a stud 29. The rear ends of the rods 18 may be cam shaped and when bumper 8 is forced backward the rods 18 lift the front edge of the plate 27 and thereby raise stud 29, projecting downward from the middle of the front edge of this plate 27. 30 is a retractile U-shaped cross-bar (Figs. 1, 4 and 4a) having a central opening 31 normally engaged by the stud 29. The arms 32 at both sides of the cross-bar 30 have slots 33 receiving screws or rivets 21a made fast to the bottom of plate 14 at opposite sides. Hence bar 30 can move backward from position in Figure 1 to position shown in Figure 4 when stud 29 is lifted out of the hole 31. Arms 33 have lateral extensions 34, the ends of which are turned upward as shown at 35 at both sides of seat 6 and each of the ends 35 has at its top a cross arm 36.

The cross or horizontal arms 36 have their mid portions 36a bent diagonally outward but the front ends and the rear ends 37 may be parallel with the length of the automobile. The sides of the seat or chair 6 have openings through which project studs 38 and 39 attached to the free ends of spring plates 40 secured inside the seat 6. At 41 (Fig. 4a) are projections secured to each arm or support 10 and said projections 41 have openings 42 to receive studs 38 to hold the arms 10 in the curved sleeves or casings 12 when the studs 38 engage projections 41 as shown in Figure 4c. By withdrawing studs 38 from projections 41 the arms 10 can be moved out of casings 12. To the rear side bar 30 are attached cables 43 secured to springs 44 (Figs. 1 and 2) affixed to the frame work of the car and at 45 (Fig. 4a) are cam projections on the inner ends of rods 18 to engage projections 28 at the opposite sides of plate 27 to push the front edge of this plate upward.

In case of the car striking a pedestrian, the bumper 8 is forced back, making the cam ends 45 of rods 18 lift the front edge of plate 27 to pull the stop 29 out of the hole 31 in bar 30. Springs 44 and cords 43 then pull back the bar 30. The inclined mid portions 36a of cross-arms 36 then force the studs 39 inward as shown in Figure 4d, bending back the springs 40 and pulling studs 38 out of holes 42 in projections 41. Then arms 10 can be projected from the position shown in Figure 9 to that shown in Figure 10. These arms are circularly curved and so are the casings 12. The casings are slotted at 46 to receive the projections 41 when arms 10 are retracted and inside casings 12 are springs 47 to move these arms out when the projections 41 are released from studs 38. Springs 47 are attached to studs 48 at the inner ends of the arms and the studs 49 inside the casings. Curved channel shaped guides 50 inside the casings 12 receive the springs 47 and within the casings are also guide rollers 11a at both sides of curved arms 10. To the inner ends of the arms 10 are attached cords or cables 52 which pass out through the ends of casings 12 over guide pulleys 51. These cords run over guide pulleys 53 (Fig. 1) mounted at fixed points on the automobile to a winding drum 54. This drum is mounted on shaft 55 in bearings on the automobile and carries a gear 56 driven by gear 57 of an electric motor 58 run by a battery 59 controlled by a switch 60. At 61 is a clutch member keyed to shaft 55 and having a groove 62 to receive the forked end of a pivoted lever 63. Drum 54 has a clutch face to be engaged by the clutch 61. On shaft 55 near 56 is another drum 64 for cords or cables 65 to pass over additional pulleys 53 and 66 (Figures 1 and 4), the cords 65 being made fast to bar 30. Drum 64 also has a clutch face to be engaged by clutch member 61. Both drums 54 and 64 are loose on the shaft but can be turned by the clutch member 61 when engaged therewith. At 68, Figure 2, is the brake pedal connected by rod 69 to the usual brake bands 70, and on the rod 69 is a collar 71 to be engaged by the forked upper end of a lever 72 connected by link 73 to bar 30.

When the bumper 8 strikes a person it is pushed back causing rods 18 to bend plate 27 up and release bar 30, so that springs 44 and cords 43 can pull back the bar 30, freeing studs 38 from projections 41. Springs 47 then shoot the arms 10 out to seize the victim and hold him, preventing him from falling to the ground and enabling him to be picked up by the seat 6. At the same time the movement of bar 30 pushes link 73 and acts upon lever 72 which engages collar 71 and pulls rod 69 to apply the brakes 9. The members 13a (Figs. 13a and 14a) are simultaneously dropped to cooperate with the brakes and stop the car, as will be described later. Clutch member 61 is normally in neutral position. After the victim is released lever 63 is moved by hand to bring drum 54 and clutch member 61 together; switch 60 is closed by hand and drum 54 then pulls upon cords 52 to retract arms 10. Projections 41 are thus carried to bring their openings into line with the studs 38. Drum 54 may now be temporarily latched or held by any suitable means or the arms 10 may be held back by a person at the front of the car, while lever 63 is thrown to move the clutch member 62 into engagement with drum 64. Motor 58 now winds up the cord 65 pulling bar 30 forward to move cross-arms 36 so that studs 39 are released as shown in Figure 4c and studs 38 can be moved by springs 40 to engage projections 41 as before, to hold the arms 10 in the casings 12. Switch 60 can then be opened.

Figures 13 to 16 show a modification by which the arms 10 are caused to move out of the casings by cords or cables wound up on a drum by an electric motor connected as in Figures 13a and 14a. In Figures 13 to 16, inclusive, the arms can be retracted by cords 76 attached to the inner ends of the arms and passing out through the adjacent ends of the casings 12 over pulleys 51. The curved arms 10 have guide rollers 11b engaging them in the casings 12 and the ends of these casings from which the arms 10 move out have pulleys 74 in openings 75. Cords or cables 77 pass over these pulleys 74 into the casings 10 and are fastened to the inner ends of the arms 10, so that when these cords or cables 77 are pulled arms 10 are projected out of the casings. Both sets of cables 76 and 77 are attached to a drum 78 on shaft 55 (Figure 13a); but are reversely wound on drum 78, so that the rotation of the drum will pay out cables 76 while taking in cables 77. In this form cross-bar 30 carries a contact 79 which, when bar 30 moved to the rear, passes over an insulated contact 80 carried say upon the front axle 81 of the car. Wire 82 connects contact 79 with motor 58 and wire 83 connects contact 80 with a solenoid coil 84 having a plunger 85 normally pushed out by spring 86. Coil 84 is connected to motor 58 through battery 59.

To the solenoid 85 are attached cables 87 running over pulleys 88 carried on a cross-bar 89 and at other fixed points on the car. Each of these cables runs to a belt crank lever 90, one adjacent to each wheel connected to catches 91 to hold up the stopping members 13a. (See Figures 13a, 14a, 23, 25 and 26). Catches 91 are engaged by pins 92 in levers 90 and slide in bearings 93 which have slots 94 for pins 92. Each catch 91 has a projecting head 95 and the opposite end of each bearing 93 contains a fixed bushing 96 for the shank of pin 91, this bushing having a similar slot adjacent slot 94 to admit pin 92. Between the bushings 96 and heads 95 are springs 92a, and the bearings 93 and bell cranks 90 are supported upon projections 95a and 95b adjacent to the rear wheels and 96a adjacent to the front wheels. Each member 13 is mounted upon an arm 13a and each arm 13a has a sloping projection 97 to rest upon adjacent head 95. When the catches 91 are withdrawn projections 97 clear the heads 95 so that members 13 can drop from their position shown in Figure 14a to the ground. At 98 are cables passing over pulleys 99 and attached to drum 54a on shaft 55.

Figure 24 shows in section the drum 78 and drum 54a on shaft 55 mounted in bearings on the lower part of the vehicle. Shaft 55 has grooves 55a and the two drums have screws 78a entering these grooves. Hence the drums can turn on the shaft but cannot slide along it. Gear 56 is keyed to shaft 55 and clutch member 61 is keyed to shaft but can slide between the two drums. When moved by the lever 63 having forked ends entering groove 62, the clutch member can be thrown into engagement with a clutch face at the end of each drum. When the member 61 is moved to engage drum 78, the cables 76 and 77 can be operated; and when this member is moved to engage the drum 54a the cable 98 can be moved. At 100 is an arm rigid with a shaft bearing a foot pedal 101, and arm 100 is connected by link 102 and links 103 to lever 63 (see Figure 13a). A spring 104 attached to links 103 and a fixed point on the car normally actuates the parts so as to make the clutch member 61 engage the clutch face on the drum 78. When lever 101 is depressed clutch member 61 is caused to engage drum 54a. Pulleys 99 are mounted on shafts 105 carried by the side beams 4 and serving as journals at their outer ends for arms 13a, which are loose thereon. Each arm 13a has a projection 13b, and at the outer ends of shafts 105 beyond the arms 13a are carried fixed arms 106 with inward extending pins 107. At 108 is a rod connecting switch 61a with a bell crank lever 109 on projection 95a, this lever having a roller 110 at one end to be engaged by a cam 111 on the rear shaft 105. See Figures 13a, 23 and 26.

With this form of invention, when the car strikes a pedestrian with the bumper 8, the spring plate 27 releases the cross-bar 30 as before, and this bar is pulled by the springs 44 and cables 43 to cause contact 79 to pass over and beyond contact 80. The circuit is thus closed through wires 82, 83 and motor 58, which turns gear 56 and drum 78 to project the arms or supports 10 to seize the pedestrian and pull him upon the seat 6. At the same time the solenoid 84 pulls the plunger 85, operates bell cranks 90 to withdraw catches 91 and allow the members 13a to drop in front of all four wheels and stop the car at once. When the car is stopped, pedal 101 is depressed to move the clutch member 61 into engagement with drum 54a and switch 61a is then closed to throw lever 109 into the path of the cam 111 on rear shaft 105. Motor 58 (Fig. 13a) now turns, operating drum 54a and pulling cables 98 to turn pulleys 99 and the shafts 105 counterclockwise in Fig. 14a so as to rotate arms 106 and cause pins 107 to strike projections 13b to lift the members 13. As soon as the members 13 are lifted cam 111 strikes lever 109, moves it sideways and by pushing the rod 108 opens switch 61a. See Figs. 13a, 23 and 24. While being lifted the arms 13a of members 13 carry their bevelled projections 97 into contact with heads 95 (Figs. 23 and 25) and push the catches 91 back. As soon as the projections 97 pass the heads 95 the springs 92a force these heads under the projections 97 and members 13 stay up.

Bar 30 can now be moved forward as before, either by hand or by an additional motor according to the arrangement shown in Figure 1. Drum 78 at this time can be kept loose on shaft 55 by holding the pedal 101 so that clutch member 61 will not engage drum 78. Hence the drum will turn freely when the arms 10 are being returned into their casings. This can be done by mechanism as stated or by hand and only a small force is required, even though springs 47a in casings 12 which assist in throwing out the arms 10 have to be compressed when arms 10 are forced back. Lever 63 and switches 61 and 61a can be mounted at any convenient accessible points and one or two men may be used to reset the arms 10.

With this apparatus if the car should strike a pedestrian arms 10 guide and support him until he is caught by the seat 6 and at the same time the brakes 9, including the bands 70, are set and the members 13 are dropped to make the car stop immediately.

Figures 33 and 34 show a different connection between the brake pedal 68 and the brake bands 70. Here the brake pedal is connected to a cord 145 attached to a cable 146 and a spring 147 between the bar 30 and a fixed part of the machine. So long as bar 30 is held by stud 29, the pedal 68 can be pressed freely to work through connection 69 to put on the brakes 9. At this time the cord 145 merely slacks when the pedal 68 is depressed. When bar 30 is released by stud 29 spring 146 pulls the bar 30 back and at the same time acts through the cord 145 to pull down the brake pedal 68 also and thus apply the brakes.

In Figures 17 to 22, inclusive, another form is shown which comprises the seat 6 and connections as before but with a different kind of means for catching the pedestrian instead of the arms 10. Said means comprise links 112 and 113 at each side of the seat 6, and a bent connecting link 114 so that the links form a complete loop. Normally these parts will have the position shown in Figures 17 and 18 and in full lines, but in an emergency the links are distended as shown in broken lines in these figures and then pulled backward toward the seat 6. The fixed base plate 14 has projections 115 flanking seat 6. These projections have bearings 116 for plungers 117 normally pushed upward by springs 118 between upper bearings 116 and collars 119 on the plungers 117. The lower end of each plunger is turned out as at 120 and carries a roller 121. Each link 112 is in position to be engaged along its rear edge by the adjacent roller 121 and the lower end of each link 112 is turned under plate 14 as at 122 and carries a roller 123. These rollers move in channels 124 having slots 125 through which journals 126 connecting rollers 123 to links 112 project. The journals have grooves 127 and at each end of channels 124 are guide pulleys 128. Cables 129 pass around the journals 126 through the guides 124 and over the pulleys 128 at fixed points on the automobile to drums 54 and 130. The journals 126 can rotate in their bearings on links 122; and as shown in Figure 19 cables 129 are so arranged that when drum 130 is wound up, cables 129 cause rotation of the journals 126 and pull the lower ends of links 112 rearward. Rollers 123 can be fixed on journals 126, and may be clear of the upper sides of the channels, and roll upon the lower sides when turned by the journals 123 and cords 129.

The links 112, 113 and 114 are pivoted together by pins 131 and springs 132 encircle these pins and normally tend to move the links into alinement (see Figures 27a, 27b and 27c). The links are shown folded together in Figure 18 and each link 112 has a stop 133 to prevent further movement of link 113 when these two links come into alinement; that is, when springs 132 take effect to move links 113 to broken line position in Figure 27a, stops 133 will arrest links 113. The ends of link 114 and links 113 can be joined in the same manner.

In operation a jar or shock received by the bumper 8 will cause the retraction of pin 29, enabling bar 30 to be pulled back as in Figure 1. Arms 36 carried by this bar will act as before to move back pins 39 operating springs 40 within seat 6 to withdraw studs 38 which project into openings through the ends of links 114 (see Figure 18). Springs 132 then cause links 112 and 113 and the ends of link 114 to move upward and go into alinement, and then cables 129 pull the lower ends of links 112 backward. At this time the rollers 121 force the links 112 downward because these rollers bear on the inclined rear edges of the links 112. Cables 129 are operated by motor 58 connected with battery 59 and wires 82 and 83 to a fixed contact 80 which may be on the plate 14, and a movable contact 79 which may be mounted and insulated on bar 30. When bar 30 moves backward the circuit of the motor 58 is closed and the motor then operates gears 56 and 57 on shaft 55 to turn drum 130. This drum is normally clutched to shaft 55 by clutch member 61 controlled by lever 63 the same as in Figure 13a. Contact 79 may be carried past contact 80 but before that happens the pedestrian will be caught by the seat 6 and held fast by the arms and links as before. After the brakes have been set and the members 13 dropped to bring the car to a standstill through suitable connections as shown in Figures 1, 13a, 2, 33 and 34, the pedestrian can be released and then the lever 63 swung to connect drum 54 to clutch member 61. By closing the switch 60, the motor will turn drum 65 to move rollers 123 and lower ends of links 112 forward. The link 114, and links 112 and 113 will then be collapsed or folded by hand as shown in Figure 18 to bring the openings in the ends of link 114 into line with studs 38. Bar 30 can then be moved forward again by hand or any suitable means to enable the arms 36 to remove pressure from studs 39 and allow the studs 38 to re-engage the arms 114.

Figures 27 and 28 show links 112 and 113 which are curved and connected to outer links 114a having heads 114b. These outer links project through slots 134 at each end of the seat 6. The links may be joined as described above in connection with Figures 27a, 27b and 27c and the springs 135 attached to the pivot pins of the links tend to throw the links forward. In case of a rearward thrust against bumper 8 releasing bar 30, this bar is drawn rearward; causing its arms 36 to press pins 39 inward and causing springs 40 to withdraw studs 38 from openings in the outer links 114a. These links will then be thrown or projected by their springs into the encircling or gripping position shown in Figure 27.

Figures 29 to 32 indicate stopping members 13 which can be mounted to co-operate with the wheels to prevent backward movement of the car after stopping and after the setting of the brakes and the members 13 at the front of the wheels as described above. In this form the rear wheels only are shown but the same appliances may be used with the front wheels also. Back of the rear axle is a shaft 105a similar to the shafts 105 above mentioned. After the car has been stopped by members 13, Figure 13a to prevent rearward movement the operator closes the switch 61b which will be at some convenient point and then solenoid 84 pulls cables 87 to throw the bell crank levers 90 to withdraw the catch pins 91 and allow the members 13 to drop as described above in connection with Figures 13a and 14a. To lift these parts later switch 61 is closed and then motor 58 through gears 57 and 56 turns a shaft 137 and rotates a drum 138; the shaft being supported by bearings in cross-bar 136 on the side beams 2. Pulley 99a then rotates shaft 105a to turn arms 106 and make pins 107 strike projections 13b and lift the members 13 as before. Switch 61 is opened to stop the motor as soon as cam 111 strikes the bell crank lever 109.

The members 13a may have their ground engaging ends notched at 139. In this notch supported by a link 140 mounted on a pin 141 is a roller 142 on a journal 143. These links can move slightly to the rear in recesses 139;

but if the car should roll backward the links are swung against the forward notches of the recesses 139 to stop the motion of the automobile.

The above described mechanism must of course leave sufficient room between the front wheels 3 and the sides of the seat 6 and other parts to avoid interference with steering. If desired, however, the casings 12 instead of being mounted to be stationary in supports 26 may be connected by encircling rings 26a (Figures 35 and 36) and secured to a swinging support 148 pivotally mounted at one end at any convenient point such as the base plate 14, and held in position by diverging springs 149 at its opposite end. These springs may be anchored to any convenient fixed points on the car. When the front wheels are turned for steering they may even strike the casings and these casings will then yield sideways to some extent. With such a construction the projections 41 on the arms 10 passing through the slots 46 in casings 12 must be made flexible.

In Figure 37 the rearward bent ends of the bumper 8 terminate in heads 15a and bar 30 has projections 30a extending close to these heads 15a. The bar may carry a catch pin 29a to engage a shallow recess in the plate 14 not shown in this figure. The recess will be sufficient to keep the bar in forward position but when the bumper 8 is forced back heads 15a will press on the bar 30 and cause it to pull catch 29a out of the recess. The cables 43 can then be operated by springs or any other means to pull the bar rearward as in Figure 1.

In Figures 38 and 39 casings 12 are supported as in Figures 34 and 35 to permit sidewise movement of casings 12. Here the outer end of each arm 10 has a projection 150 passing through a slot in the end of adjacent casing 12, with a perforated end to receive a stud 38a on a bent flexible element 36a attached to each of the casings 12. This element will carry stud 39a. Adjacent to each element 150 is a flexible strip 151 secured at one end to some convenient fixed point. This element will extend from its fixed point rearward and outward and the extensions 34 of the arms 33 of the bar 30 will carry fingers 32a which press against the outer sides of these elements 151. In case of collision if the driver turns his wheels sharply to one side, say to the right, the two casings 12 will move slightly to the right. The rearward movement of the bar 30, being released from the stud 29 as in Figure 1, will cause the fingers 32a to make the strips 151 press down against studs 39a and release the parts 150 from the studs 38 so that the arms 10 can be moved out. These arms can be projected by the same means as above set forth. At the same time the casings 12 are free to swing sideways within certain limits.

In Figures 40, 41 and 42 the construction and operation is the same as in Figures 1 and 13a except that in place of springs 44 and cables 43, a drum 64a is operated by motor 58, to pull back cables 44a and retract the bar 30 when it is released from the stop 29. The bottom of the bar 30 carries an insulated contact 153 and to the bottom of the plate 14 is affixed an insulated contact 154. Wires connect these two contacts to motor 58 and batteries 59. When the bumper 8 moves back and causes contact 153 to engage contact 154, the motor rotates, turns the clutch 61a normally engaging the drum 64a and pulls cables 44a to retract bar 30 and causes the arms 10 to be projected and the brakes and members 13 to be operated as before. To pull the bar 30 and its associated parts forward again lever 63 is moved to bring the clutch member 61a into engagement with drum 54a and then by closing switch 60 the motor can again be rotated. At this time the clutch 64a will be lose on shaft 55 so that the cords 44a will not interfere with the forward motion of bar 30. The action of the drum 54a and clutch member 61a here is to pull on cables 65, which pass over pulleys 65a forward over pulleys 66 and back to bar 30, to draw this bar again to forward position in readiness to be released from stud 29 by the rods 18.

The bumper 8 being of flexible steel or such steel covered with rubber or suitable material is yieldable and hence will not bruise the victim or break any of his bones when it strikes him.

With this invention the automobile or other motor vehicle will stop at once when it strikes any object animate, or inanimate, thus protecting pedestrian and the inmates of the vehicle and the vehicle itself from injury.

Having described my invention, what I believe to be new and what I desire to secure and protect by Letters Patent of the United States are:

1. Safety apparatus for motor vehicles comprising parts for holding a pedestrian, parts for supporting the pedestrian and parts controlled by the supporting parts for applying the brakes and further obstructing the wheels to bring the vehicle to a standstill when the parts for holding the pedestrian are actuated.

2. Apparatus according to claim 1 wherein the parts enumerated are caused to be released for actuation by a yieldable bumper at the front of said vehicle.

3. Safety apparatus for motor vehicles comprising a movable bumper at the front of the vehicle, a seat at the front of the vehicle, members for holding a pedestrian upon said seat in case the vehicle strikes said pedestrian, a cross-bar beneath said seat, means for projecting the holding members into operative position and means controlled by the cross-bar when actuated by the bumper to release the holding means.

4. Safety apparatus for motor vehicles comprising a pair of curved casings at the front of the vehicle, holding arms in said casings and means for causing said arms to be projected in case the vehicle strikes a pedestrian to embrace and support the latter.

5. Safety apparatus for motor vehicles comprising a seat at the front of a vehicle, holding arms comprising folded links pivotally connected to each other and mounted at each side of the seat, said links comprising a cross link extending in front of said seat, and means automatically operated when the vehicle strikes a pedestrian to cause said links to be distended upward and then drawn rearward and moved downward to hold the pedestrian in position to be supported by the seat.

6. Safety apparatus for motor vehicles comprising a seat at the front of the vehicle, folded links pivotally connected to each other and mounted at each side of said seat, said links being curved toward the middle of the seat, and means operated by the vehicle striking a pedestrian to cause the links to be distended and to come together from each side of the seat at the front thereof to hold the pedestrian in position to be supported by the seat.

7. Safety apparatus for motor vehicles comprising a seat at the front of the vehicle, means for gripping and supporting a pedestrian upon said seat, means for operating said last named means and connections controlled by said means for simultaneously setting the brakes of the vehicle.

8. Safety apparatus for motor vehicles comprising a seat, a yieldable bumper in front of the seat, means adjacent to the seat for holding a pedestrian thereon, a cross-bar beneath the seat, stopping members adjacent to the front of each wheel of the vehicle, and connections whereby the bumper releases the cross-bar and the cross-bar then permits actuation of the holding means, causing said connections including electrical circuits for the stopping members to come simultaneously into position to bring the vehicle to a standstill.

9. Safety apparatus for motor vehicles comprising stopping members supported to the rear of one or more of the wheels, catches for supporting said members out of operative position, bell cranks for withdrawing the catches, a solenoid and battery therefor, and connections between the solenoid and said bell cranks to actuate the latter to retract said catches.

10. Safety apparatus for motor vehicles comprising a stopping member mounted adjacent to the wheel of the vehicles, the stopping member having one end recessed and means for pivotally mounting a roller in said recess for the purpose set forth.

11. Safety apparatus for motor vehicles comprising a flexible bumper, a cross bar, a spring plate, a catch carried by the plate to engage and hold the cross-bar, rods attached to the bumper for actuating the plate to free the bar, and means controlled by said bar for supporting a pedestrian struck by said vehicle and simultaneously bringing the vehicle to a stop.

12. Safety apparatus for motor vehicles comprising a flexible bumper, a cross-bar to the rear of said bumper, a catch carried by the bar to engage the vehicle and hold the bar in a given position, means carried by the bumper to be actuated when it strikes a pedestrian to force the bar backward and withdraw its catch, means controlled by the bar to seize and support said pedestrian and means also controlled by said bar to bring the vehicle to a stop.

13. Safety apparatus for motor vehicles comprising a bumper, curved casings at the front of the vehicle, holding members in said casings to be projected therefrom in case the vehicle bumper strikes a pedestrian to seize and support the latter, and means for enabling said casings to yield sideways mounting the casings on said vehicle.

14. Apparatus according to claim 13 wherein connections are provided for enabling the holding members in said casings to be released and projected into gripping position by turning movement of the wheels at the front of a vehicle.

15. Safety apparatus for motor vehicles comprising a pair of curved casings at the front of the vehicle, members in said casings to be projected and support a pedestrian struck by the vehicle, springs for projecting said members, and cables for subsequently returning said members into their casings.

16. Safety apparatus for motor vehicles comprising a pair of curved casings at the front of the vehicle; holding members in said casings to be projected therefrom to grip and support a pedestrian struck by the vehicle; means comprising cables for causing operative movement of said members and means comprising additional cables for returning said members into the casings.

17. Safety apparatus for motor vehicles comprising a yieldable bumper at the front of a vehicle; parts controlled by said bumper to seize and support a pedestrian struck by the vehicle, stopping members for the wheels of the vehicle, additional parts for setting the brakes and causing said members to obstruct the wheels to bring the vehicle to an immediate standstill, and means comprising cams and levers to lift said members to their original position.

18. Safety apparatus for motor vehicles comprising a cross-bar at the front of a vehicle means for holding said cross-bar in stationary position, a seat at the front of the vehicle above the cross-bar, a yieldable bumper in front of the seat, members for holding a pedestrian struck by the vehicle on said seat, spring catches mounted at the sides of the seat and parts controlled by the bumper to release the cross-bar which then withdraws the catches and permits said members to be moved out into operative position.

19. Safety apparatus for motor vehicles comprising a yieldable bumper at the front of a vehicle, a cross-bar held in stationary position to the rear of the bumper, a seat above the bumper, means actuated by the bumper to release the bar, parts controlled by said bar to be projected forward when the bar is released to seize and support a pedestrian struck by the bumper, and means comprising electric circuits which are closed by the movement of the bar to bring the vehicle to a standstill and then enable the various operating parts to be restored into their original positions.

Signed at New York in the county of New York and State of New York, this 31st day of October, A. D. 1929.

GEORGE ROTTMAN.